United States Patent [19]

Tagashira et al.

[11] 4,203,835
[45] May 20, 1980

[54] WASTE WATER TREATMENT METHOD USING ACTIVATED CARBON

[75] Inventors: Yoshiaki Tagashira; Hitoshi Takagi; Katsumi Inagaki, all of Kurashiki, Japan

[73] Assignee: Asahi Kasei Kogyo Kabushiki Kaisha, Osaka, Japan

[21] Appl. No.: 836,997

[22] Filed: Sep. 27, 1977

[30] Foreign Application Priority Data

Aug. 25, 1977 [JP] Japan .................. 52-101068

[51] Int. Cl.$^2$ .............................. C02B 1/14
[52] U.S. Cl. ...................... 210/33; 210/40; 562/513
[58] Field of Search .................. 210/30 R, 33, 39, 40, 210/63 R, 521, 522, 34; 252/416–419; 260/465.9, 526 N; 562/513, 600

[56] References Cited

U.S. PATENT DOCUMENTS

| | | | |
|---|---|---|---|
| 3,150,105 | 9/1964 | Ledding | 252/416 |
| 3,399,135 | 8/1968 | Conley et al. | 210/521 |
| 3,442,798 | 5/1969 | Schoeffel et al. | 210/40 |
| 4,069,148 | 1/1978 | Hutton et al. | 210/40 |

FOREIGN PATENT DOCUMENTS 50-102587 8/1975 Japan .

OTHER PUBLICATIONS

Gitchel et al., "Powdered Activated Carbon Regeneration by Wet Air Oxidation", *Symposium Series of American Institute of Chemical Engineering*, No. 151, vol. 71, pp. 415–422, 1975.

*Primary Examiner*—Charles N. Hart
*Assistant Examiner*—Ivars Cintins
*Attorney, Agent, or Firm*—Armstrong, Nikaido, Marmelstein & Kubovcik

[57] ABSTRACT

A method for effectively treating waste water discharged from the ammoxidation process for the production of acrylonitrile which comprises treating waste water or a preliminary oxidized liquid of said waste water with activated carbon in an adsorption and separation zone, subjecting the spent carbon slurry from said adsorption and separation zone to wet oxidation in the presence of copper values and ammonium ions at a pH of not higher than 5 in a regeneration zone to thereby regererate the spent carbon, and recycling the regenerated activated carbon to said adsorption and separation zone. The rate of regeneration of the spent carbon in the regeneration zone can be further increased by adjusting the amount of copper values to at least 1,000 ppm. Thus, the waste water containing extremely hardly decomposable substances can be effectively treated and, at the same time, the spent carbon can be regenerated with less degradation of adsorption capacity.

18 Claims, 3 Drawing Figures

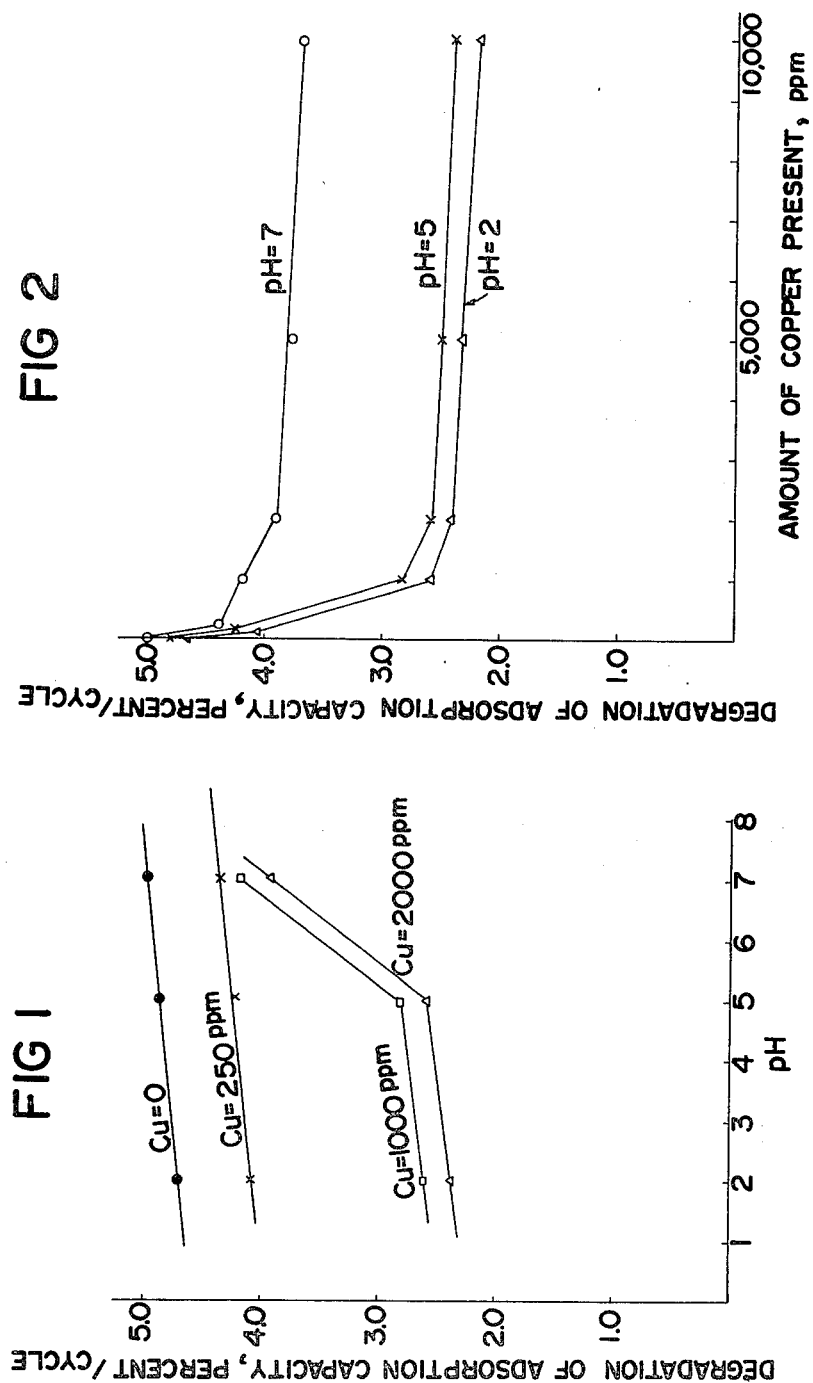

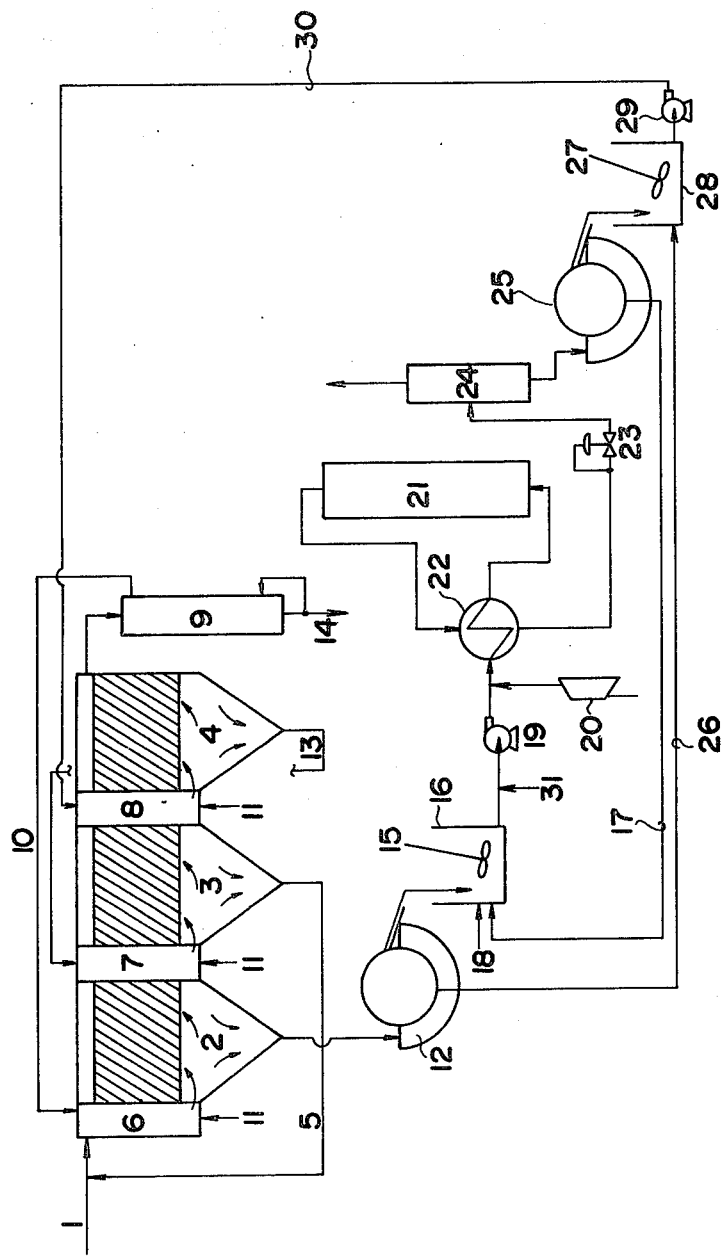

WASTE WATER TREATMENT METHOD USING ACTIVATED CARBON

The present invention relates to a method for treating very effectively a waste water discharged from the ammoxidation process for the production of acrylonitrile. More particularly, this invention is concerned with a waste water treatment method comprising highly purifying, with activated carbon, a waste water discharged from the ammoxidation process or an oxidized liquid formed by subjected said waste water to wet oxidation, subjecting the resulting spent carbon in the form of an aqueous slurry to wet oxidation to oxidation-decompose pollutants adsorbed on the activated carbon and recover the activity thereof, and recycling the regenerated activated carbon for use in the purification treatment.

In the ammoxidation process for the production of acrylonitrile, there is generally recovered from the reaction system a gaseous reaction mixture containing cyan compounds, acetonitrile, ammonia and high boiling point polymeric compounds in addition to intended acrylonitrile. In order to separate the acrylonitrile from this gaseous reaction mixture, sulfuric acid is added thereto in an amount sufficient to fix ammonia in the form of ammonium sulfate and simultaneously the gaseous reaction mixture is cooled. Accordingly, waste water containing minute amounts of acrylonitrile, acetonitrile, cyan compounds, high boiling point polymeric compounds and ammonium sulfate is discharged from the cooling and scrubbing step. Further, waste water containing the foregoing substances exclusive of ammonium sulfate is discharged from the acrylonitrile purifying step also. These waste waters are highly polluted and they are organic waste waters which can hardly be oxidation-decomposed. For treating these waste waters, there have heretofore been proposed an incineration method and a wet oxidation method. According to the former, however, a high oxidation-decomposition rate can be attained by incineration but a large quantity of heat is required for maintaining high temperatures. Further, this method inevitably involves troublesome additional operations of treating an exhaust gas containing ammonia, $NO_x$, etc. According to the latter, in general, the oxidation-decomposition rate is in the range of 50 to 80%, and in order to enhance the oxidation-decomposition rate, very drastic conditions should be adopted. Accordingly, from both the technical and economical viewpoints, it is very difficult to practice this method on an industrial scale.

With a view to overcoming the above-mentioned defects of the conventional wet oxidation method, we previously developed and proposed a method in which the wet oxidation treatment is carried out in the presence of copper values optionally with ammonium ions. According to this method, the oxidation-decomposition rate can be remarkably enhanced. However, the waste water treated according to this method still contains several hundred to several thousand ppm of chemical oxygen demanding substances, and from a viewpoint of attaining complete prevention of environmental pollution, it is not preferred to discard such water without being subjected to additional treatment.

As such an additional treatment method, there are known a so-called coagulation method comprising adding a coagulant to waste water to coagulate and precipitate pollutants and removing the precipitate by filtration, a so-called activated sludge method comprising decomposing pollutants with microorganisms and a so-called adsorption method comprising adsorbing pollutants on an adsorbent. In order to obtain high quality treated water, the adsorption method is ordinarily adopted. This adsorption method includes an ion exchange method, an activated clay method and an activated carbon method. Among them is most effective the method using powdery activated carbon. Powdery activated carbon has high adsorption capacity and high adsorption rate and is inexpensive, and therefore, this method has heretofore been used widely for the purification of water, waste water treatment and other purposes.

However, when this activated carbon adsorption method is applied to a large-scale treatment, a large quantity of spent activated carbon is formed and when it is thrown away as it is, secondary pollution is caused. Accordingly, this method still involves problems to be solved in connection with prevention of environmental pollution and saving of resource.

Since powdery activated carbon consists of hydrophobic particles when it is used as activated carbon, recovery of such particles in the form of a condensed slurry or cake after contact with water requires, in general, addition of a coagulant and/or applications of a pressure floatation method, a pressure filtration method using a precoat filter or a filter cloth, and/or a vacuum filtration method using a vacuum filter. These methods, however, are not suitable for a large-scale treatment because they necessarily involve adjustment of conditions for addition of chemicals, use of special equipments, and subsequent complicated operations for control and maintenance of these conditions and equipments. Furthermore, the use of inorganic chemicals results in increase of the volume and quantity of resulting slurries or cakes, disposal of which involves difficulties and requires troublesome operations. When organic chemicals are used, chemical oxygen demanding substances are caused to increase and heavy loads are imposed on post treatments, leading to economical disadvantages.

As the method for the regeneration of spent carbon, there are known a thermal regeneration method comprising heating spent carbon at a temperature of 400° C. or more in an atmosphere free of oxygen to thermally decompose contaminants and pollutants adsorbed on the activated carbon, an electrolytic oxidation method comprising oxidation-decomposing adsorbed contaminants and pollutants with oxygen generated by electrolysis of water, and a wet oxidation method comprising contacting a slurry of spent carbon with molecular oxygen gas under high temperature and high pressure conditions to oxidation-decompose adsorbed contaminants and pollutants.

These methods, however, are still insufficient. For example, the thermal regeneration method requires a large quantity of heat and loss of activated carbon by combustion and scattering is considerable. Further, some kinds of adsorbed substances are not sufficiently oxidized by the electrolytic oxidation method and wet oxidation method, and the adsorption capacity is rapidly degraded as the regeneration treatment is repeated.

Under such background, we have made extensive and intensive research works and investigations with a view to developing a technique of eliminating the foregoing defects involved in the conventional methods for purifying with activated carbon a hardly decomposable organic waste water discharged from the ammoxidation process for the production of acrylonitrile and also to a technique of effectively regenerating spent carbon and using it repeatedly for the above purification method. As a result, it has been found that this object can be attained by combining specific solid-liquid separation means with improved wet oxidation techniques. Based on this finding, we have now completed the present invention.

In accordance with the fundamental aspect of the present invention, there is provided a waste water treatment method comprising treating with activated carbon in an adsorption and separation zone waste water discharged from the ammoxidation process for the production of acrylonitrile or an oxidized liquid formed by subjecting said waste water to a wet oxidation treatment, subjecting the spent carbon slurry from the adsorption and separation zone to a wet oxidation treatment in the presence of copper values and ammonium ions at a slurry pH adjusted to a level not higher than 5 in a regeneration zone to thereby regenerate the spent carbon, and recycling the regenerated activated carbon to the adsorption and regeneration zone.

As described hereinbefore, waste water discharged from the ammoxidaton process for the production of acrylonitrile includes waste water discharged from the cooling and scrubbing step, waste water discharged from the purifying step and waste water discharged from other steps. In the present invention, these waste waters may be treated independently, or they may be mixed together and the resulting mixed waste water may be treated at a time. When the concentration of pollutants, namely chemical oxygen demanding substances, is several hundred to several thousand ppm, the treatment with activated carbon is directly conducted without any particular pretreatment, whereby the pollutant concentration is reduced to 20 or 30 ppm. When the concentration of pollutants is in the order of 10,000 ppm, waste water is first diluted with treated water or service water supplied from the outside of the treatment system and the activated carbon treatment is then conducted. Alternatively, waste water may be first subjected to a wet oxidation treatment in the presence of copper values and ammonium ions and the oxidized liquid is then subjected to the treatment with activated carbon. In other words, in the method of the present invention, whether the treatment of waste water is conducted separetely or collectively according to the stage or source from which the waste water is discharged and whether or not there is conducted a pretreatment such as dilution or wet oxidation according to the concentration of pollutants are not critical at all. Incidentally, when the oxidized liquid obtained by the wet oxidation treatment is subjected to the activated carbon treatment, dissolved copper values may be recovered by using an ion exchange resin or the like and may be recycled and used in the step of the wet oxidation treatment of waste water.

The concentration of powdery activated carbon to be incorporated in waste water from the ammoxidation process or a preliminarily treated liquid thereof is varied depending on such factors as the concentration of pollutants in the waste water or preliminarily treated liquid and adsorbing characteristics and intended removal rate of the pollutants, but in general, the concentraton of powdery activated carbon may be in the range of 0.1 to 10% by weight based on the waste water or the preliminarily treated liquid. The waste water or preliminarily treated liquid in which powdery activated carbon has been incorporated is subjected to air agitation, stirring, swirling or the like to effect solid-liquid contact sufficiently, whereby pollutants in the waste water or preliminarily treated liquid are adsorbed on the activated carbon. The resulting mixed slurry is caused to rise in a separation zone along the top faces of a plurality of guide plates inclined by a certain angle to the horizontal direction and disposed in parallel to each other, whereby the slurry having the specific gravity increased by adsorption of the pollutants is separated from the treated water. The separated slurry is recovered and introduced into a regeneration zone where the slurry is contacted in the liquid state with a molecular oxygen-containing gas in the presence of copper values and ammonium ions at a pH adjusted to a level not higher than 5 to effect regeneration of the activated carbon. Then, the regenerated activated carbon is recycled to the separation zone. The pH adjustment may be conducted by adding a mineral acid such as sulfuric acid after affirmation of the concentrations of copper values and ammonium ions.

According to the present invention, as mentioned hereinbefore, the adsorption and separation zone is connected to the activated carbon regeneration zone and the regenerated activated carbon is recycled to the adsorption and regeneration zone, and the oxidized filtrate obtained by dehydration of the slurry from the regeneration zone is fed to the spent carbon before the regeneration zone. When this procedure is adopted, the treatment can be conducted in a completely closed system while preventing unoxidized pollutants, copper values and ammonium ions from being discharged outside of the system.

In the separation zone to be used in the present invention, a plurality of guide plates inclined by a certain angle to the horizontal direction are disposed in parallel to each other, and the activated carbon-containing slurry rise along the top faces of these guide plates while having contct with polluted water. During this rising movement, the activated carbon in the slurry adsorbs pollutants in the polluted water, and as the amount of the adsorbed pollutants increases, the specific gravity of the slurry is caused to increase and the slurry is separated from the treated water and gathered in the lower portion of the separation zone to form a concentrated slurry, while the treated water rises along the lower faces of the guide plates and taken out of the top portion of the separation zone.

In general, commercially available powdery activated carbon may be used as they are in the present invention, and they are directly incorporated into slurries to be fed to the adsorption tank. More specifically, any of powdery activated carbon prepared from coal, coconut shell or the like by steam activation, chemical activation or the like may be used in the present invention, and all of these kinds of activated carbon can be regenerated in the present invention in the above-mentioned manner.

The spacing between two adjacent inclined guide plates and the inclination angle of the guide plates will now be described.

In general, better results are obtained when the spacing between two adjacent guide plates is narrower, and an optimum spacing is varied depending on the sedimentation velocity of the solids and the flow rate of polluted water which velocity and flow rate are determined by the particle size distribution in the powdery activated carbon, but it is generally in the range of 25 to 150 mm. When the spacing is narrower than 25 mm, the effect is rather low, and when the spacing is broader than 150 mm, the effect attained per unit volume of the separation tank is decreased and no high treatment efficiency is attained. The inclination angle of the guide-plates has influences on the sedimentation depth of the carbon particles and the sedimentation area. As the inclination is close to the right angle to the horizontal direction, the sedimentation area is reduced and the number of the guide plates should be increased, and since the sedimentation depth of the particles is increased, a long time is required for completion of sedimentation. On the other hand, as the inclination angle is reduced, no good sliding of the sedimented particles is attained and withdrawal of the particles becomes difficult. Accordingly, it is generally preferred that the inclination angle of the guide plates is 45° to 70° to the horizontal direction.

In the present invention, it is preferred that the solid concentration of the slurry to be withdrawn is in the range of 5 to 30% by weight. When the concentration is lower than 5% by weight, the volume of the spent carbon-containing slurry is large and loads imposed on the subsequent dehydration and regeneration steps described hereinafter are increased. When the concentration is higher than 30% by weight, the flowability of the slurry is reduced to render withdrawal and transportation of the slurry difficult and cause clogging.

The so withdrawn spent carbon slurry is fed to the dehydration step and the resulting cake is fed to the regeneration step after it has been mixed with the oxidized filtrate from the regeneration step, which filtrate still contains unoxidized pollutants, copper values and ammonium ions. The dehydration is generally accomplished by a settling sedimentation concentration method or by using a vacuum or pressure filter machine equipped with a filter cloth or sponge. The filtrate formed at this dehydration step is fed to the regeneration step and mixed with a regenerated carbon cake formed by dehydrating the regenerated carbon slurry to impart flowability thereto. The dehydrated spent carbon slurry is diluted with the oxidized filtrate to reduce the concentration to a level of the original slurry concentration and the mixture is fed to the regeneration step.

In the regeneration zone, the spent carbon slurry which has thus been mixed with the oxidized filtrate is contacted in the liquid state with an oxidative gas containing molecular oxygen in an amount sufficient to completely oxidation-decompose the adsorbed pollutants, in the presence of copper values and ammonium ions under high temperature and high pressure conditions at a pH adjusted to a level not higher than 5, whereby only the adsorbed pollutants are oxidation-decomposed and the spent carbon is regenerated. The resulting regenerated carbon slurry is dehydrated so that the solid concentration is the same as that of the spent carbon slurry. The oxidized filtrate is returned to the feed inlet of the regeneration zone, while the regenerated carbon cake is converted to a slurry again by incorporation of the filtrate from the step of dehydration of the spent carbon slurry as mentioned above and this slurry is recycled to the adsorption step and used again for the adsorption treatment.

As described before, in practicing the method of the present invention, it is necessary to carry out the wet oxidation at a pH of not higher than 5.

Features and advantages of the present invention will be better understood by the description taken in connection with the accompanying drawings in which:

FIG. 1 is a graph showing the relationship between the pH condition of the wet oxidation stage and the degradation of adsorption capacity of the regenerated activated carbon;

FIG. 2 is a graph showing the relationship between the amount of copper present in the wet oxidation stage and the degradation of adsorption capacity of the regenerated activated carbon; and FIG. 3 is a diagram showing a preferred mode of flowsheet for practicing the method of the present invention.

In practicing the method of the present invention, the activated carbon is repeatedly used and regenerated by the wet oxidation. The degradations of adsorption capacity of the activated carbon per cycle were examined and shown in FIGS. 1 and 2. In FIGS. 1 and 2, the degradation of adsorption capacity is shown in terms of percent per cycle. The percent shown is an average of data obtained in repeated cycles. As clearly seen from FIG. 1, the pH value of 5 is critical in the present invention.

In the present invention, the source of copper values is not critical, and metallic copper, inorganic acid salts of copper, organic acid salts of copper and oxides and hydroxide of copper may be used as the source of copper values. More specifically, there can be used salts such as copper sulfate, copper nitrate, basic copper sulfate and copper acetate, metallic copper, copper oxides, copper hydroxide, and copper halides such as copper chloride, copper bromide, copper iodide and copper fluoride.

As seen from FIG. 2, it is preferred that at the wet oxidation stage the copper values are present in the spent carbon slurry in an amount of at least 1,000 ppm based on the spent carbon slurry and especially 1,000 to 10,000 ppm. If the content of the copper values is lower than 1,000 ppm, the effeciency of regeneration of the spent carbon having hardly decomposable organic materials adsorbed thereon is very low, and even when the copper values are present at a content higher than 10,000 ppm, no particular increase of the effect is expected but economical disadvantages are brought about.

As mentioned above, metallic copper or a copper compound is used as the source of the copper values, and such source is not substantially dissolved out under the above regeneration conditions, namely under high temperature and high pressure conditions in the liquid phase, but it is, as such, kept adsorbed on the activated carbon. In this instance, according to the present invention, it is necessary to adjust and maintain the pH at a level not higher than 5 and especially 2 to 5. If the pH is controlled within this range, the regeneration efficiency can be remarkably enhanced by the synergistic effect of the copper values and ammonium ions and the adsorption capacity can be restored to a level substantially equal to the adsorption capacity of virgin activated carbon. Accordingly, accumulation of degradation of the adsorption capacity is not caused in the present invention. Another effect attained by adjusting the pH to a level not higher than 5 is as follows. That is, ashes formed and precipitated by oxidation of the spent carbon are dissolved and included in the oxidized liquid in the dissolved state, and they are discharged from the system together with the oxidized liquid carried by the regenerated carbon cake formed by dehydration of the regenerated carbon slurry, through the adsorption and separation zone. Accordingly, accumulation of ashes can be effectively prevented.

As the source of ammonium ions, there may preferably be employed ammonium sulfate, ammonium chloride, ammonium iodide, ammonium nitrate, ammonium sulfamate, ammonium hydrogencarbonate, ammonium formate, ammonium acetate, ammonium oxalate and ammonium tartrate. The amount of ammonium ions is not particularly critical in the present invention, but in general, it is preferred that ammonium ions are present in the spent carbon slurry in an amount of 0.12 to 1.2% by weight based on the slurry. If the amount is smaller than 0.12% by weight, the effect is insufficient, and when the amount is larger than 1.2% by weight, no appreciable increase of the effect is expected but economical disadvantages are brought about. In this connection, it should be noted that waste water discharged from the ammoxidation process for the production of acrylonitrile sometimes contains a substance capable of forming ammonia under the wet oxidation conditions and in such case, ammonium ions need not be added to the system.

The regeneration temperature may generally be in the range of 150° to 300° C. and the regeneration is preferably carried out at 200° to 300° C. At a temperature lower than 150° C., the rate of oxidation-decomposition of the adsorbed pollutants is low and the rate of regeneration of the adsorption capacity is low. At a temperature higher than 300° C., the rate of oxidation-decomposition of the adsorbed pollutants is increased but, at the same time, the degree of oxidation of activated carbon also is unfavorably increased. As a result, though the rate of regeneration of the adsorption capacity is increased, the rate of recovery of activated carbon is decreased. Therefore, neither of too low and too high regeneration temperatures is preferred.

The regeneration is ordinarily conducted for 15 minutes to 2 hours. The regeneration pressure is maintained at such a level as will prevent gasification of water at the regeneration temperature and keep the liquid state. In general, the regeneration pressure is maintained at 15 to 150 kg/cm$^2$ gauge.

In the foregoing manner, the spent carbon slurry is wet-oxidized and regenerated, and a regenerated activated carbon slurry is obtained. This regenerated activated carbon slurry is filtered and dehydrated to separate it into a regenerated carbon cake and an oxidized filtrate. In order to facilitate transportation of the regenerated carbon cake, it is mixed with the filtrate obtained at the step of dehydration of the spent carbon slurry and then recycled in the form of a slurry to the adsorption step. On the other hand, the oxidized filtrate which still contains minute amounts of unoxidized substances, copper values and ammonium ions is added to the spent carbon cake and fed to the regeneration step again.

The present invention will now be illustrated in detail by reference to FIG. 3 which ia a flowsheet illustrating one embodiment of the present invention.

Waste water or preliminarily treated waste water from a line 1 is mixed with an activated carbon slurry 5 from the lower portion of a former stage separation tank 3 and with a back-washed activated carbon slurry 10 from a sand filter 9, and the mixture is introduced into a first stage adsorption tank 6, into which air 11 (for stirring) is blown from the lower portion thereof so as to attain sufficient contact between the waste water or preliminarily treated waste water and activated carbon. Then, the mixture of the waste water or preliminarily treated waste water and the activated carbon slurry is introduced into a separation tank 2 provided therein with a plurality of inclined guide plates 38. The mixture is separated into a slurry phase and an aqueous phase while it is rising on the top faces of the respective guide plates. The slurry phase is gathered in a slurry reservoir, withdrawn therefrom and fed to a dehydrator 12, while the aqueous phase rises along the lower faces of the guide plates and is overflowed into an adsorption tank 7 of the next stage, in which the so introduced liquid is mixed with an activated carbon slurry from a line 13 and mixing is sufficiently effected with the aid of introduced air 11. Then, the mixture is fed to a separation tank 3 of the next stage provided therein with inclined guide plates. In the same manner as described above, the separation and adsorption treatments are carried out successively in the respective stages (FIG. 3 shows a three-stage system). According to need, the so treated water is introduced into the sand filter 9 where finely divided activated carbon is removed from the liquid. The resulting clarified water is discharged from the treatment system through a line 14. The finely divided activated carbon collected in the sand filter 9 is back-washed by utilizing a part of the treated water, and the back-washed carbon slurry is recycled to the first stage adsorption tank 6 and used again for the adsorption treatment.

The slurry phase fed to the dehydrator 12 is separated into a spent carbon cake and a filtrate by the action of the dehydrator 12. The cake is introduced into a spent carbon slurry-preparing tank 16 provided with a stirrer 15, where the cake is mixed with an oxidized filtrate from a line 17 and with copper values and ammonium ions from a catalyst feed line 18 so that a predetermined slurry concentration, predetermined copper value and ammonium ion concentrations and predetermined pH are attained. The pressure of the so prepared spent carbon slurry is elevated to a predetermined level by a pressure-elevating pump 19. Molecular oxygen (air) necessary for wet oxidation and regeneration is mixed with the spent carbon slurry after the pressure has been elevated to a predetermined level by a high pressure gas compressor 20. The mixture is preheated by a heat exchanger 22 and is fed to a wet regeneration column 21 where adsorbed pollutants are oxidation-decomposed and the spent carbon is regenerated. The regenerated carbon slurry containing the oxidized liquid and the exhaust gas are cooled by the heat exchanger, and the pressure is lowered to atmospheric pressure by means of a valve 23 for maintaining a predetermined pressure in the system. Then, the slurry and gas are fed to a gas-liquid separator where the regenerated carbon slurry is separated from the exhaust gas. The exhaust gas is discharged into open air, while the regenerated carbon slurry is withdrawn from the lower portion of the gas-liquid separator 24 and is fed to a regenerated carbon dehydrator 25 where it is separated into a regenerated carbon cake and an oxidized filtrate.

The oxidized filtrate is returned through the line 17 to the spent carbon slurry-preparing tank 16, while the regenerated carbon cake is fed to a regenerated carbon slurry-preparing tank 28 provided with a stirrer 27 where is it mixed with the spent carbon filtrate from a line 26 to form a spent carbon slurry having an increased flowability. Then, the spent carbon slurry is fed to an adsorption tank of the final stage through a line 30 by means of a pump 29.

The present invention will now be described by reference to the following Examples that by no means limit the scope of the invention.

EXAMPLE 1

According to the flowsheet including the adsorption step and the wet oxidation—regeneration step illustrated in the FIG. 3, waste water discharged from the ammoxidation process for the production of acrylonitrile was treated. Illustratively stated, mixed waste water having a CODcr value (the amount of consumed oxygen determined according to the potassium dichromate method) of 8,000 ppm from the cooling and scrubbing step and the purification step of the above process, which was fed at a rate of 375 liters/hr, was diluted with industrial service water fed at a rate of 2,625 liters/hr, and the resulting diluted waste water having a CODcr value of 1,000 ppm was treated at a rate of 3,000 liters/hr. Equipments and conditions adopted for this treatment are as follows:

A. Adsorption, Separation and Dehydration Steps

Adsorption Tanks:
  Three stages connected in series: residence time of 15 minutes in one stage
  Agitation: stirring by air
Separation Tanks:
  Guide plate: 50 mm×50 mm×60 cm (length)
  Inclination angle: 60°
  Slurry rising velocity:
    First stage: 3 m/hr
    Second stage: 2 m/hr
    Third stage: 1 m/hr
Powdery activated carbon:
  Raw material: coconut shell
  Activation method: steam activation
  Particle size: more than 98% passable through a 325-mesh (Tyler) sieve
  Amount added: 1.0% by weight based on waste water
Spend carbon slurry:
  Concentration: 10% by weight
  Withdrawal rate: 300 liters/hr
Sand filter:
  Filter material: anthracite plus fine sand
  Liquid, velocity (based on empty column): 5 m/hr
  Powdery carbon content in passed water: below 1 ppm
Dehydrators:
  Model: belt type vacuum dehydrator (same models were used for both spent carbon and regenerated carbon)
  Filtration rate: 120–140 Kg/m$^2$-hr
  Water content in cake: 55% by weight
  Powdery carbon content in filtrate: 100 ppm B. Wet Oxidation—Regeneration Step Regeneration columns:
  Two stages connected in series: 20 cm in inner diameter and 4.750 m in height
  Regeneration temperature: 240°–250° C.
  Operation pressure: 70 Kg/cm$^2$ gauge
  Air feed rate: 12 m$^3$/hr (as calculated in the normal state)
  Copper value concentration: 5,000 ppm based on the slurry
  Copper value source: copper sulfate
  Ammonium ion concentration: 1.2% by weight based on the slurry
  Ammonium ion source: ammonium sulfate
  Slurry pH: 3.0

Obtained results are shown in Table 1.

Table 1

| | Cycle number of Repetition of Regeneration Operation | | | | |
|---|---|---|---|---|---|
| | 0 (virgin carbon) | 1 | 2 | 3 | 4 |
| CODcr value (ppm) of treated water | 45 | 73 | 73 | 92 | 101 |
| Adsorption capacity of regenerated carbon (% based on virgin carbon) | 100 | 98 | 99 | 98 | 98 |
| Loss (combustion loss + handling loss) (%) of carbon (per cycle) | — | 1.0 | 1.0 | 1.0 | 1.0 |

Note: No additional virgin carbon was supplied.

COMPARATIVE EXAMPLE 1

The same diluted waste water as treated in Example 1 was treated by using the same equipments under the same conditions as in Example 1 except that copper values and ammonium ions were not present and the pH was not adjusted in the wet oxidation—regeneration step. Obtained results are shown in Table 2.

Table 2

| | Cycle number of Repetition of Regeneration Operation | | | | |
|---|---|---|---|---|---|
| | 0 (virgin carbon) | 1 | 2 | 3 | 4 |
| CODcr value (ppm) of treated water | 45 | 102 | 157 | 206 | 254 |
| Adsorption capacity of regenerated carbon (% based on virgin carbon) | 100 | 95 | 89 | 85.7 | 81.4 |
| Loss (combustion loss + handling loss) (%) of carbon (per cycle) | — | 1.0 | 1.0 | 1.0 | 1.0 |

Note: No additional virgin carbon was supplied.

COMPARATIVE EXAMPLE 2

City sewage having a CODcr value of 80 ppm was treated at a rate of 30 m$^3$/hr according to the adsorption step and oxidation—regeneration step illustrated in FIG. 3 under the same conditions as adopted in Example 1 except that the amount added of powdery activated carbon was adjusted to 0.1% by weight based on the sewage, copper values and ammonium ions were not present at the regeneration step and the pH was not adjusted. The amount treated was 10 times the amount treated in Example 1 at the adsorption and separation steps, and the amount treated was 1.0 time the amount treated in Example 1 at the dehydration and regeneration steps. Obtained results are shown in Table 3.

Table 3

|  | Cycle number of Repetition of Regeneration Operation | | | | |
|---|---|---|---|---|---|
|  | 0 (virgin carbon) | 1 | 2 | 3 | 4 |
| CODcr value (ppm) of treated water | 15 | 17 | 19 | 21 | 23 |
| Adsorption capacity of regenerated carbon (% based on virgin carbon) | 100 | 98 | 96 | 94 | 92 |
| Loss (combustion loss + handling loss) (%) of carbon (per cycle) | — | 1.0 | 1.0 | 1.0 | 1.0 |

Note: No additional virgin carbon was supplied.

From comparison of the results obtained in Example 1 with the results obtained in Comparative Examples 1 and 2, it will be apparent that in the method comprising treating with activated carbon waste water discharged from the ammoxidation process for the production of acrylonitrile and regenerating the spent carbon by wet oxidation, if at the regeneration step of wet-oxidizing hardly decomposable substances adsorbed on the activated carbon, copper values and ammonium ions are present and the pH is adjusted at a level lower than 5, especially 3, a high rate of recovery of the adsorption capacity can be attained and the adsorption capacity is not degraded even if the activated carbon is subjected to repeated cycles of the adsorption and regeneration.

EXAMPLE 2

Copper values (copper sulfate) were incorporated (at a concentration of 1,000 ppm) into the waste water (CODcr value=3%; NH$_4^+$ content=1.2% by weight) discharged from the cooling and scrubbing step of the ammoxidation process for the production of acrylonitrile, and 300 liters/hr of this waste water and 45 m$^3$/hr (as calculated in the normal state) of air were fed to the regeneration step of Example 1 from the line 31 shown in FIG. 3. The waste water was treated at a temperature of 250° C. under a pressure of 70 Kg/cm$^2$ gauge. The residence time was 60 minutes. The thus preliminarily treated water recovered from the gas-liquid separator 24 had a CODcr value of 900 ppm and the romoval rate was 97%. The preliminarily treated water was temporarily stored in a treated water tank (not shown in FIG. 3) and was then fed at a rate of 3 m$^3$/hr to the adsorption step of Example 1 to effect a treatment with activated carbon. The amount added of the activated carbon was 1% by weight based on the preliminarily treated waste water. The resulting treated water had a CODcr value of 45 ppm and a copper value concentration of 700 ppm. The copper ions present in the treated water in the dissolved state was recovered with PEARL RESIN (tradename of a weakly acidic ion exchange resin manufactured and sold by Asahi Kasei Kogyo Kabushiki Kaisha, Japan)

The spent carbon slurry was withdrawn from the separation tank. In this instance the solid content of the slurry was adjusted by regulating the volume of withdrawal to have 10% by weight, and the copper values were incorporated thereinto at a concentration of 3,630 ppm based on the slurry and the pH was adjusted to 4. The slurry was fed to the regeneration step with air fed at a rate of 12 m$^3$/hr as calculated in the normal state while bypassing the dehydrator. The regeneration was carried out at a temperature of 250° C. under a pressure of 70 kg/cm$^2$ gauge with the residence time being 60 minutes. The adsorption capacity of the regenerated activated carbon was 98% based on the activity of virgin activated carbon. While this cycle of adsorption and regeneration was repeated many times, no substantial degradation of the adsorption capacity of the regenerated active carbon was observed.

EXAMPLE 3

Mixed waste water (CODcr value=8,000 ppm) discharged from the ammoxidation process for the production of acrylonitrile at the cooling and scrubbing step and the purification step was diluted with industrial service water so that the whole amount became 4 times that of the original waste water. To the thus diluted waste water having a CODcr value of 2,000 ppm were added powdery activated carbon at a concentration of 9,000 ppm to effect a treatment with the activated carbon. The treated waste water separated by filtration had a CODcr value of 2,000 ppm. The spent carbon slurry formed was subjected to adjustment by adding the filtrate to have a solid content of 15% by weight based on the slurry, and divided into several portions of equal amount. One portion (100 ml.) of them and 16.5 liters (as calculated in the normal state) of air were charged into a stirrer—equipped autoclave provided with an electric furnace. Further, ammonium sulfate was added thereto in an amount of 1.2% by weight, based on the slurry, in terms of ammonium ions. Wet oxidation was effected by heating at 250° C. for 1 hour, with varied amount of copper values and varied value of pH as indicated in Table 4. After subjected to the wet oxidation—regeneration as mentioned above, the regenerated carbon separated from the oxidized liquid by filtration was used for the regeneration of the above-mentioned diluted, mixed waste water by adsorption, and the rate of regeneration (in terms of degredation of adsorption capacity) was examined. Illustratively stated, the above operation (a cycle of adsorption to regeneration) was repeated three times and the average value of the degradation per cycle [(the adsorption capacity in the preceding cycle−the adsorption capacity of the cycle)/(the adsorption capacity in the preceding cycle)×100=degradation of adsorption capacity, percent/cycle] was obtained with respect to varied amount of copper values present and plotted against the pH value of the spent carbon slurry in the wet oxidation step (see FIG. 1). The results are summarized in Table 4.

Table 4

| Degradation of Adsorption Capacity, percent/cycle Copper values, ppm | | | | |
|---|---|---|---|---|
| pH | 0 | 250 | 1,000 | 2,000 |
| 2 | 4.7 | 4.1 | 2.6 | 2.4 |
| 5 | 4.8 | 4.3 | 2.8 | 2.6 |
| 7 | 5.0 | 4.4 | 4.2 | 3.9 |

As seen from Table 4, the degradation of adsorption capacity of the regenerated carbon is remarkably small when the wet oxidation—regeneration is conducted at a pH of not more than 5. It also is seen that this tendency is remarkable at a copper value concentration of not less than 1,000 ppm.

EXAMPLE 4

The substantially same procedures as described in Example 3 were repeated except that, at the wet oxidation—regeneration step, in place of ammonium sulfate, ammonium sulfamate was employed in an amount of 1.3% by weight, based on the spent carbon slurry, in terms of ammonium ions. Observations were made in the same manner as described in Example 3. The results are summarized in Table 5.

Table 5

| | Degradation of Adsorption Capacity, percent/cycle Copper values, ppm | | |
|---|---|---|---|
| pH | 0 | 500 | 1,000 |
| 5 | 4.8 | 4.1 | 2.6 |
| 7 | 5.0 | 4.5 | 4.2 |

As seen from Table 5, considerable degradation of adsorption capacity of the regenerated carbon is observed when the copper value concentration in the spent carbon slurry is less than 1,000 ppm. It also is seen that this tendency is remarkable at a pH of not more than 5.

As is apparent from the foregoing illustration, according to the present invention, by adopting an integrated system comprising, in combination, an adsorption and separation step using powdery activated carbon and a wet oxidation—regeneration step using as the catalysts copper values and ammonium ions, waste water discharged from the ammoxidation process for the production of acrylonitrile or a preliminarily treated liquid thereof can be treated with a high efficiency and the spent powdery activated carbon can be effectively regenerated and repeatedly used stably.

What is claimed is:

1. A waste water treatment method comprising contacting with activated carbon in an adsorption and separation zone waste water discharged from the ammoxidation process for the production of acrylonitrile or an oxidized liquid formed by subjecting said waste water to a wet oxidation treatment to adsorb onto said activated carbon pollutants in said waste water; separating the resulting mixture into a spent carbon slurry and water; subjecting the spent carbon slurry from the adsorption and separation zone to wet oxidation in the presence of copper values and ammonium ions at a pH of not higher than 5 in a regeneration zone to thereby regenerate the spent carbon; and recycling the regenerated activated carbon to the adsorption and separation zone.

2. A waste water treatment method according to claim 1, wherein the concentration of copper values in the slurry is at least 1,000 ppm.

3. A waste water treatment method according to claim 2, wherein the concentration of the copper values in the slurry is in the range of 1,000 ppm to 10,000 ppm.

4. A waste water treatment method according to claim 1, wherein the source of the copper values is a member selected from the group consisting of inorganic acid salts of copper, organic acid salts of copper, oxides of copper, hydroxide of copper, halides of copper, metallic copper and mixtures thereof.

5. A waste water treatment method according to claim 4, wherein the source of the copper values is copper sulfate.

6. A waste water treatment method according to claim 1, wherein the concentration of the ammonium ions in the slurry is in the range of 0.12 to 1.2% by weight based on the slurry.

7. A waste water treatment method according to claim 1, wherein the source of the ammonium ions is a member selected from the group consisting of ammonium sulfate, ammonium chloride, ammonium iodide, ammonium nitrate, ammonium sulfamate, ammonium hydrogencarbonate, ammonium formate, ammonium acetate, ammonium tartrate and mixtures thereof.

8. A waste water treatment method according to claim 1, wherein the wet oxidation is carried out at 150° to 300° C.

9. A waste water treatment method according to claim 8, wherein the wet oxidation is carried out at 200° to 300° C.

10. A waste water treatment method according to claim 1, wherein the wet oxidation is carried out under a pressure of 15 to 150 Kg/cm$^2$ gauge.

11. A waste water treatment method according to claim 1, wherein the residence time of the slurry in the regeneration zone is in the range of 15 minutes to 2 hours.

12. A waste water treatment method according to claim 1, wherein the pH of the slurry in the regeneration zone is adjusted to 2 to 5.

13. A waste water treatment method according to claim 1, wherein the activated carbon is incorporated into said waste water or said oxidized liquid in an amount of 0.1 to 10% by weight.

14. A waste water treatment method according to claim 1, wherein the adsorption and separation zone comprises a plurality of guide plates inclined with respect to the horizontal direction and are disposed in parallel to each other.

15. A waste water treatment method according to claim 14, wherein the inclination angle of the guide plate is in the range of 45° to 70° with respect to the horizontal direction.

16. A waste water treatment method according to claim 14, wherein the spacing between two adjacent guide plates is 25 to 150 mm.

17. A waste water treatment method according to claim 1, wherein the solid content in the slurry withdrawn from the adsorption and separation zone is in the range of 5 to 30% by weight.

18. A waste water treatment method according to claim 1, wherein the regenerated activated carbon slurry discharged from the regeneration zone is separated into a regenerated activated carbon cake and an oxidized filtrate, the spent carbon slurry discharged from the adsorption and separation zone is separated into a spent carbon slurry cake and a filtrate, the regenerated activated carbon cake is mixed with said filtrate separated from the spent carbon cake and the resulting slurry is recycled to the adsorption and separation zone, and the spent carbon cake is mixed with said oxidized liquid separated from the regenerated activated carbon cake and the resulting slurry is recycled to the regeneration zone, whereby the entire treatment is conducted in a closed system.

* * * * *